(12) United States Patent
Wu et al.

(10) Patent No.: US 7,107,842 B2
(45) Date of Patent: Sep. 19, 2006

(54) ANGULAR RATE SENSOR USING MICRO ELECTROMECHANICAL HALTERE

(75) Inventors: Wei-Chung Wu, Albany, CA (US); Robert Wood, Berkeley, CA (US)

(73) Assignee: The Regents of the University of California, Oakland, CA (US)

( * ) Notice: Subject to any disclaimer, the term of this patent is extended or adjusted under 35 U.S.C. 154(b) by 0 days.

(21) Appl. No.: 10/838,480

(22) Filed: May 3, 2004

(65) Prior Publication Data
US 2004/0221648 A1 Nov. 11, 2004

Related U.S. Application Data

(60) Provisional application No. 60/469,781, filed on May 11, 2003, provisional application No. 60/469,311, filed on May 10, 2003.

(51) Int. Cl.
*G01P 9/04* (2006.01)
(52) U.S. Cl. ............... 73/504.15; 73/866.4; 244/22
(58) Field of Classification Search ......... 73/504.15, 73/504.16, 504.12, 514.33, 514.34, 514.36, 73/866.4; 244/22
See application file for complete search history.

(56) References Cited

U.S. PATENT DOCUMENTS

| 4,381,672 | A | * | 5/1983 | O'Connor et al. ....... 73/504.15 |
| 4,924,131 | A | * | 5/1990 | Nakayama et al. ...... 73/514.34 |
| 5,336,960 | A | * | 8/1994 | Shimizu et al. .......... 73/504.12 |
| 5,747,691 | A | * | 5/1998 | Yoshino et al. .......... 73/504.16 |
| 5,747,692 | A | * | 5/1998 | Jacobsen et al. ......... 73/514.36 |
| 5,847,487 | A | * | 12/1998 | Maeno .................... 73/504.15 |
| 6,158,280 | A | * | 12/2000 | Nonomura et al. ...... 73/504.15 |

OTHER PUBLICATIONS

W. Wu et al., "Halteres for the Micromechanical Flying Insect," Proceedings of the 2002 IEEE International Conference on Robotics & Automation, Washington, DC, May 11-15, 2002, pp. 60-65.*
Nalbach, G.; "The halteres of the blowfly *Calliphora*"; Journal of Comparative Physiology A; © 1993: p. 293-300.
Sato, Hiroshi, Fukuda, Toshio, Arai, Fumihito, Iwata, Hitoshi, & Itogiawa Kouichi; "Analysis of Parallel Beam Gyroscope", Proceeding of the 1999 IEEE International Conference on Robotics & Automation, © May 1999, p. 1632-1637, Detroit Michigan.

* cited by examiner

*Primary Examiner*—John E. Chapman
(74) *Attorney, Agent, or Firm*—Charles J. Kulas; Trellis Intellectual Property Law Group, PC

(57) ABSTRACT

An angular rate sensing system suitable for a micromechanical flying insect (MFI) device. The system includes a rod, or haltere, that is moved in a plane by a piezoelectric actuator. Bending of the haltere due to angular movement of a body onto which the haltere is coupled is sensed with a resistive strain gage. In a first embodiment the haltere is actuated (i.e., made to beat or sweep) by simple coupling to an actuator. In a second embodiment, a four-bar structure is used to amplify the motion of a piezoelectric bender to cause haltere beating. Another embodiment achieves haltere beating by parasitic transmission of vibrations of the MFI body to the base of the haltere.

2 Claims, 3 Drawing Sheets

Fourbar

ANGULAR RATE SENSOR USING MICRO ELECTROMECHANICAL HALTERE

CLAIM OF PRIORITY

This application claims priority from U.S. Provisional Patent Applications Ser. No. 60/469,311 filed on May 10, 2003 and U.S. Provisional Patent Applications Ser. No. 60/469,781 filed on May 11, 2003 which is hereby incorporated by reference as if set forth in full in this document.

RELATED APPLICATIONS

This application is related to co-pending U.S. patent application Ser. No. 10/830,374 filed on Apr. 22, 2004 which is hereby incorporated by reference as if set forth in full in this document.

ACKNOWLEDGMENT OF GOVERNMENT SUPPORT

This invention was made with Government support under Grant (contract) No. ECS-9873474 awarded by NSF, and N0014-1-0617 awarded by ONR MURI. The Government has certain rights to this invention.

BACKGROUND OF THE INVENTION

This invention is related in general to angular rate sensors and more specifically to an angular rate sensor modeled after biological mechanisms such as the halteres of the insect order Diptera.

An important aspect of flying machines is maintaining stability and balance. It is often necessary to provide highly accurate; fast, and robust means of detecting angular velocities of the body reference frame with respect to a fixed global reference frame. The requirements for rotational velocity measurements are particularly strict in micro aerial vehicles (MAVs) or micromechanical flying devices such as a micromechanical flying insect (MFI).

Because an MFI is designed to approximate the size and weight, and to mimic the biological structure and mechanical motion, of a natural insect, the design of components for an MFI is very challenging. Traditional approaches to rotation measurement in MFIs can be found in micro-electromechanical systems (MEMS) designs. MEMS designs include the use of gyroscopes as angular rate sensors. However, such gyroscopes have proven to be difficult to adapt to the specific needs of MFIs. For example, a gyroscope's resolution, rate, power requirements and other characteristics may be insufficient for an MFI design.

MEMS gyroscopes have also proven insufficient in other aspects. For example, the materials and design can be complex and intricate and can result in a low yield and short time-to-failure. Sensing with capacitive sensors may provide non-linear signals and require structures that impede operation or add to the weight of the MFI. In some applications, the prior art needs vacuum packaging because of sensitive design and weak actuation.

SUMMARY OF EMBODIMENTS OF THE INVENTION

The present invention provides an angular rate sensor system suitable for a micromachine such as an MFI. The system includes a haltere that is moved in a plane by a piezoelectric actuator. Bending of the haltere due to angular movement of a body onto which the haltere is coupled is sensed with a resistive strain gage. In a first embodiment the haltere is actuated (i.e., made to beat or sweep) by simple coupling to an actuator. In a second embodiment, a four-bar structure is used to amplify the motion of a piezoelectric bender to cause haltere beating. Another embodiment achieves haltere beating by parasitic transmission of vibrations of the MFI body to the base of the haltere.

These provisions together with the various ancillary provisions and features which will become apparent to those artisans possessing skill in the art as the following description proceeds are attained by devices, assemblies, systems and methods of embodiments of the present invention, various embodiments thereof being shown with reference to the accompanying drawings, by way of example only, wherein:

One embodiment of the invention provides an apparatus for sensing angular motion, the apparatus comprising a body; a rod movably coupled to the body; an actuator for producing a movement coupled to the rod; and a sensor for sensing a bending of the rod in response to a rotational movement of the body.

Another embodiment provides an apparatus for sensing angular motion in a micromechanical device, the apparatus comprising a rod; means for producing a sweeping movement of the rod; means for sensing a bending of the rod in response to a rotational movement of the rod.

Another embodiment provides an apparatus modeled after an insect's haltere for sensing angular velocity in a flying machine.

DETAILED DESCRIPTION OF EMBODIMENTS OF THE INVENTION

Details of the invention are described in the paper entitled "Halteres for the Micromechanical Flying Insect," W. C. Wu, R. J. Wood, R. S. Fearing, Department of EECS, University of California, Berkeley, Calif. 94720, 6 pages.

A preferred embodiment of the invention uses a biological model to achieve rotational velocity measurement in a Micromechanical Flying Insect (MEL). Mechanical halteres are modeled after biological halteres present in an actual fly. Halteres resemble small balls at the end of thin rods. A length of a haltere is typically only a few millimeters. During flight the halteres beat up and down in a plane rather quickly at the same frequency as the wings. The halteres are attached to an airframe, or "body," and can be used to measure rotation of the body by detecting a Coriolis effect that causes the haltere's rod to bend in a direction outside of the plane of beating.

Figure 1:
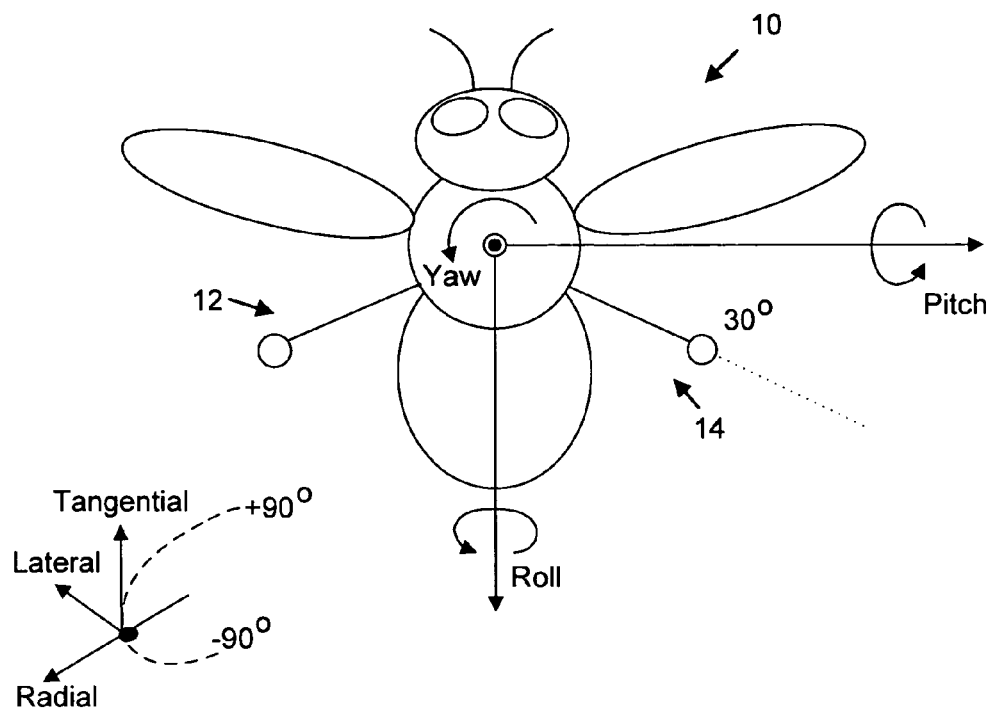
FIG. 1 shows the basic orientation of halteres in a fly in exaggerated form.

FIG. 1 shows the basic orientation of halteres in a fly in exaggerated form.

In FIG. 1, halteres 12 and 14 are shown in approximate orientation to roll, pitch and yaw axes for fly 10. Although specific orientations and measurements may be presented in connection with specific embodiments of the invention, other embodiments may vary significantly in such measurements and still achieve desirable results within the scope of the invention.

Figure 2:
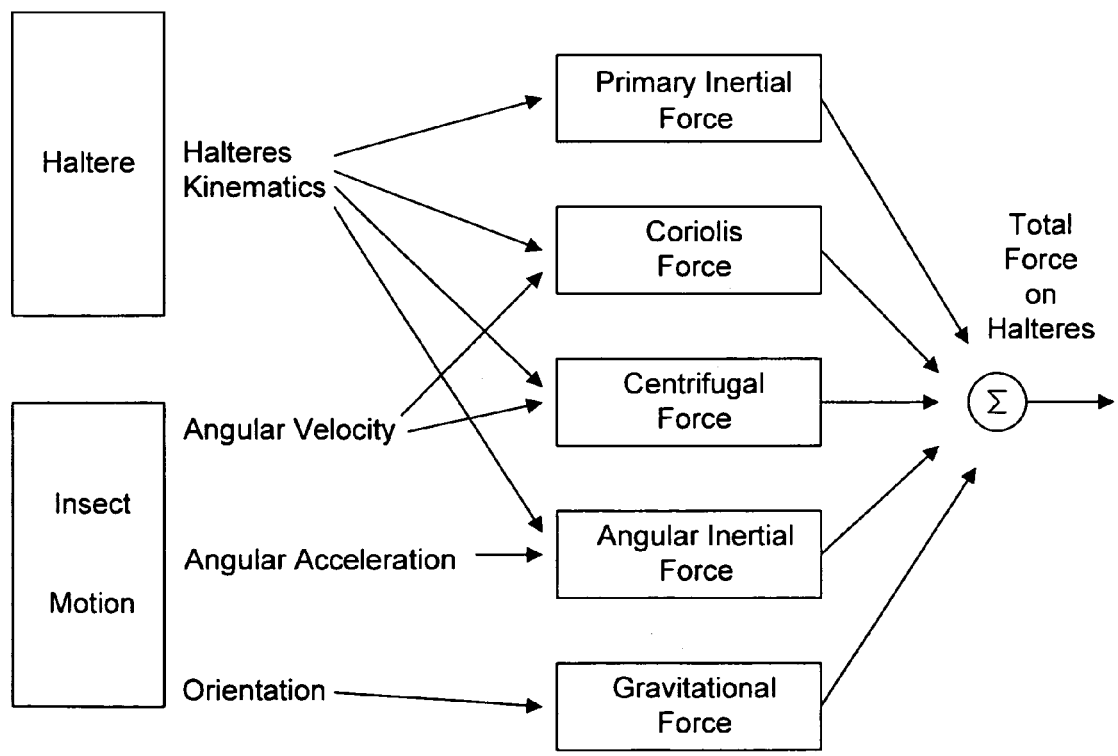
FIG. 2 shows forces on the halteres.

Research on actual insect flight reveals that in order to maintain stable flight, insects use halteres to detect body rotations via gyroscopic forces. The halteres of a fly evolved from hindwings and are hidden in the space between thorax and abdomen so that air current has negligible effect on them. There are about 400 sensilla embedded in the flexible exoskeleton at the haltere base. These mechanoreceptors function as strain gages to detect the Coriolis force exerted on the halteres. During flight the halteres beat up and down in vertical planes through an average angle of nearly 180° anti-phase to the wings at the wingbeat frequency. When a fly's halteres are removed or immobilized, it quickly falls to the ground. In addition, the two halteres of a fly are non-coplanar (each is tilted backward from the transverse plane by about 30°) so that flies can detect rotations about all three turning axes. A complex force that is the result of insect motion and haltere kinematics acts on the halteres during flight. Characteristics and components of the total force on the halteres are shown in the diagram of FIG. 2. Assuming no translational motion of the insect, the total force can be expressed in vector notation by the following:

$$F = mg - ma - m\omega' \times r - m\omega \times (\omega \times r) - 2m\omega \times v \quad (1)$$

where m is the mass of the haltere, r, v, and a are the position, velocity, and acceleration of the haltere relative to the insect body, $\omega$ and $\omega'$ are the angular velocity and angular acceleration of the insect, and g is the gravitational constant. Further, this force can be decomposed into radial, tangential, and lateral components as depicted by the exploded view of the haltere in FIG. 1. Insect's body rotations produce centrifugal ($-m\omega \times (\omega \times r)$) and Coriolis ($-2m\omega \times v$) forces on the haltere. The centrifugal force is generally smaller than the Coriolis force and mostly in the radial and tangential directions. Moreover, since the centrifugal force is proportional to the square of angular velocity of the insect, it provides no information on the sign of rotations. The Coriolis force, on the other hand, is proportional to the product of the angular velocity of the insect and the instantaneous haltere velocity.

The Coriolis force has components in all three directions and contains information on the axis, sign, and magnitude of the insect's body rotation. The angular acceleration force ($-m\omega' \times r$) is proportional to the product of the angular acceleration of the insect and the instantaneous position of the haltere. The angular acceleration and the Coriolis force signals are separable because of the 90° phase shift (they are orthogonal functions). The primary inertial force (–ma) depends on the haltere acceleration relative to the insect body. This force is orders of magnitude larger than the Coriolis force and has only radial and tangential components. The gravitational force (mg) is always constant and depending on the haltere position and the insect's body attitude in space, its distribution in the three directions varies. However, the effect of this gravitational force on the angular velocity sensing is negligible because it is a tonic lateral component which can be considered as DC offset on the Coriolis force and removed easily by the subsequent signal processing step.

Figure 3:
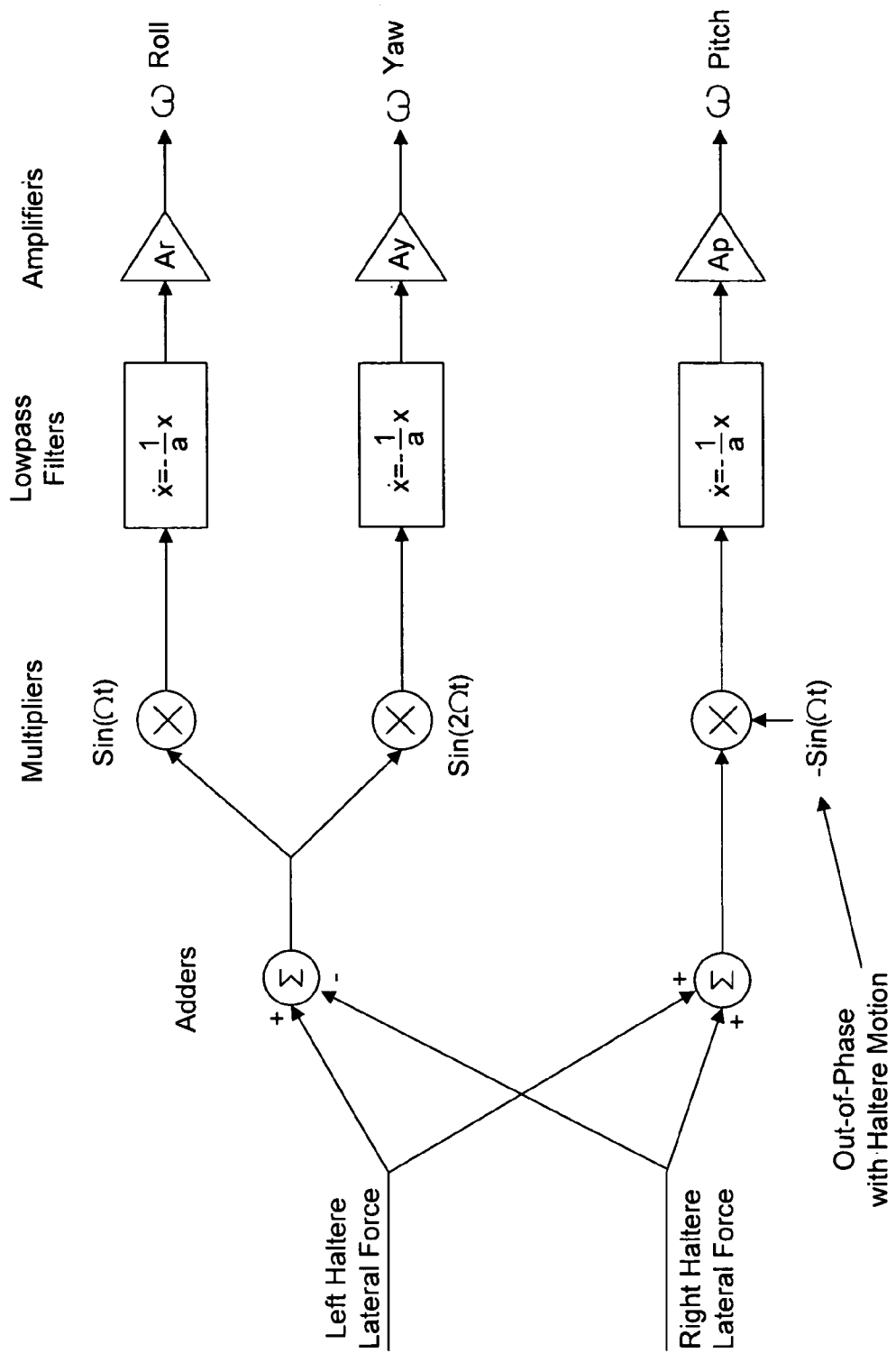
FIG. 3 illustrates the demodulation scheme in a preferred embodiment.

Utilizing the characteristics (frequency, modulation, and phase) of the force signals on the left and right halteres, a demodulation scheme is used to distinguish roll, pitch, and yaw rotations. First, a pitch rotation can be separated from roll and yaw rotations by adding the left and right signals. Because the left and right signals are in-phase for pitch while out-of-phase for roll and yaw, adding the left and right signals retains pitch component and eliminates roll and yaw components. Then, roll and yaw rotations can be separated by multiplying demodulating signals of different frequencies. A sinusoidal signal at the haltere frequency retrieves the roll signal while a sinusoidal signal of double the haltere frequency retrieves the yaw signal. FIG. 3 illustrates the demodulation scheme in a preferred embodiment. Ideally, the magnitudes of the amplifiers, $A_r$, $A_y$, and $A_p$, would be proportional to $-\frac{1}{2}m$, where m is the mass of the haltere.

The above parameters are used for the haltere length, mass, velocity, and stroke amplitude. The specific orientation and design of the haltere(s) on the body can vary as the performance or response of the control system can be calibrated to performance of the haltere depending on specific position, length, mass, etc.

The haltere design in a preferred embodiment uses only one sensing degree of freedom. In other embodiments, additional degrees can be used. The preferred design of the haltere allows for high stiffness in the tangential direction and compliance in the lateral direction. Thus, sensing of the inertial forces can be minimized and the smaller Coriolis forces can be detected. The haltere uses a shape of a flat beam with the wide face in the plane of the haltere beating. The ratio of the stiffness in the two directions is given by the following:

$$\frac{k_t}{k_l} = \frac{\frac{EI_t}{3l^3}}{\frac{EI_l}{3l^3}} = \frac{I_t}{I_l} = \frac{\frac{bh^3}{12}}{\frac{hb^3}{12}} = \frac{b^2}{h^2} \quad (2)$$

where $I_t$, and $I_l$, are the tangential and lateral cross sectional moments of inertia, b is the width of the beam, and h is the thickness.

One concern with the design of the haltere is actuation. Since the Coriolis force is proportional to the haltere velocity, it is desirable to have a high haltere beat frequency and a large stroke. One actuation design places the haltere on a vibrating structure with a high Q compliant beam in between. The vibrating structure, e.g., a piezoelectric actuator, drives the haltere into resonance, while its high Q gives large stroke amplitudes. This method has the benefits of not only being simple to construct, but also this structure has the ability to be driven parasitically from the body vibrations of the MFI. A second approach places the haltere on the output link of a fourbar mechanism driven by a piezoelectric actuator similar to other approaches used to drive mechanical wings in MFI devices.

In the piezo-actuated vibrating structure a mechanical haltere measures the Coriolis force using strain gages at its base which measure moments applied in the direction orthogonal to its beating plane. In order to determine the minimum Coriolis force acting on the haltere the simulation parameters of 400 Hz beat frequency at an amplitude of $\alpha = 0.5$ rad, and a length l of 5.5 mm, the peak velocity of the mass is found to be 2.27 m/s, $\omega_{min}$ is set to 1 rad/s and the mass was set to 10 mg, so that the minimum Coriolis force acting on the mass is 22.7 µN.

The haltere can be thought of as a cantilever, with one end fixed at the point of rotation. Thus, the Coriolis force acting on the mass produces a strain in the beam defined by the following:

$$F_c = \frac{M}{l-x} = \frac{EI\varepsilon}{z(l-x)} \quad (3)$$

where $F_c$, is the Coriolis force, M is the generated moment, x is the distance from the base of the cantilever to the strain gage, E is the Young's modulus of the haltere material, I is the cross sectional moment of inertia, z is the distance from the neutral axis to the strain gage, and $\varepsilon$ is the strain in the haltere. This equation shows that the maximum moment, and thus the maximum sensitivity, will occur by placing the gage as close to the point of rotation as possible. The haltere is constructed in such a way that there is a high Q compliant section to allow for rotation, and then the beam is twisted to allow compliance in the desired direction. Thus, the minimum dimension x was constrained to be 2 mm. The modulus E is given to be 193 GPa since the material used was stainless steel.

The cross sectional moment of inertia is $I=bh^3/12$, thus the final parameters to be determined for the haltere were b and h. Using a thickness of 50 µm and a width of 0.5 mm, along with the minimum Coriolis force gives the minimum strain $\varepsilon_{min}=2\times10^{-6}$ which is above the noise floor for typical strain gage signal conditioners. Also, from Equation 2, the ratio of tangential to lateral stiffness is 100. For actuation, the haltere was connected directly to the free end of a cantilevered PZT unimorph. This was done in such a way that the Q of the haltere was sufficiently high to allow for greater motion than that of the PZT alone.

Other embodiments can use any suitable manner of connection, coupling or attachment and can obtain suitable results. Any number of halteres and orientations may be used. For example, two halteres can be used together and oriented differently along the ω-axis to sense each of the three angular velocities and further test the demodulation techniques.

Figure 4:
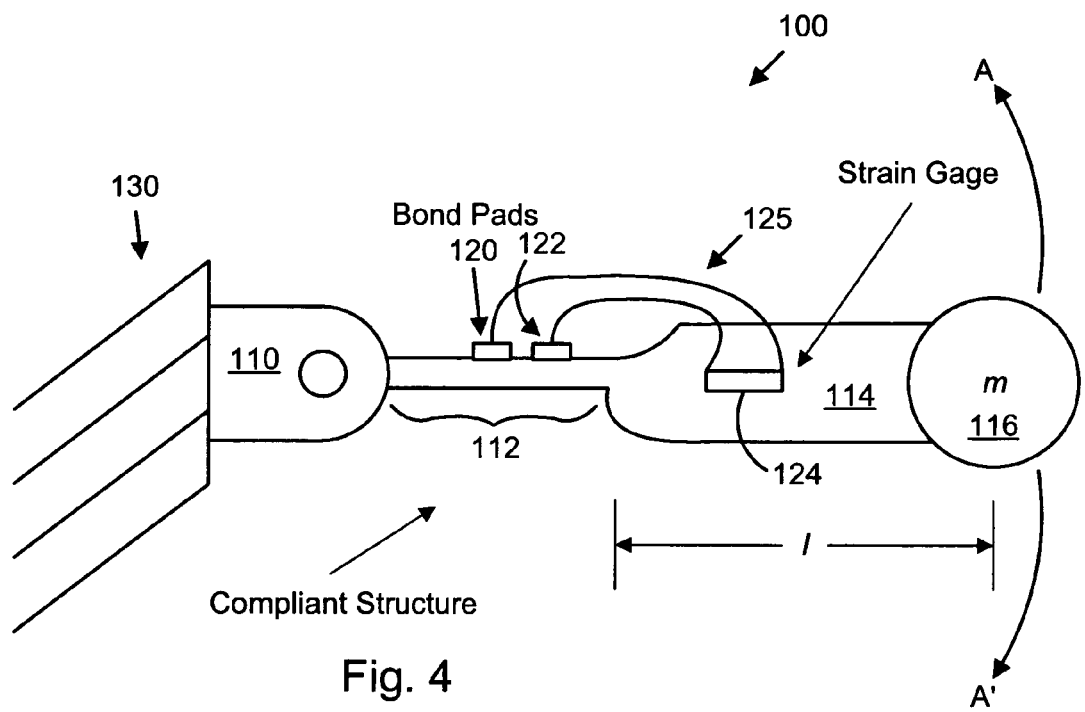
FIG. 4 illustrates a first embodiment of a haltere design.

FIG. 4 illustrates a first embodiment of a haltere design.

In FIG. 4, haltere 100 is shown in a side view. Haltere 100 includes coupling 110, compliant section 112, bonding pads 120 and 122, strain gage 124, rod 114 and end mass 116. Extremely thin gold leads at 125 are used to conduct an electrical signal from the strain gages to the bonding pads without damaging or interfering with the halteres. For example, any addition of parallel stiffness to the structure is avoided. Alternative embodiments can use different schemes such as by using wireless transmission to send a signal from the strain gage to a detector. Optical, radio-frequency, sonar, radar, laser, infrared or other position and/or motion detection approaches can be used. In general, any suitable approach for detecting haltere position and movement, including future technological developments, can be suitable for use with the present invention.

In a preferred embodiment, another strain gage (not shown in FIG. 4) is located on the other side of rod 114 opposite strain gage 124. Haltere 100 is coupled via coupling 110 to an actuator 130 (only partially shown) so that the actuator beats the haltere in the direction A–A'. The actuator, in turn, is coupled to a body of an MFI (not shown). As the haltere is swept in the direction A–A', and the MFI body is rotated, Coriolis forces cause a bending of rod 114 with a component perpendicular to the plane of haltere beating. This component is measured by the strain gages and the measured signal is transmitted to detection circuitry for processing and use in a suitable control system to respond to MFI movement and stabilize flight. Details of this design are described in the paper.

As described in connection with FIG. 4, elongated strain gages are affixed along the length of the haltere. Due to limited surface area of the haltere, only a half bridge circuit is used as the detector. However, in other embodiments a full Wheatstone bridge might be used and could be more accurate. The half bridge in the preferred embodiment was achieved by placing one gage on either side so that one gage is in compression while the other is in tension. The sensors used were 1 mm long by 100 µm wide semiconductor strain gages made by Entran, Inc. In other embodiments, any suitable type of strain gage, placement, sensing circuitry or other ways to detect properties of a haltere during operation can be employed. For example, a haltere may be actuated at a position other than at an end of the haltere. Actuation can be by body vibrations transmitted to the haltere without the need for a piezoelectric or other active actuator.

Figure 5:
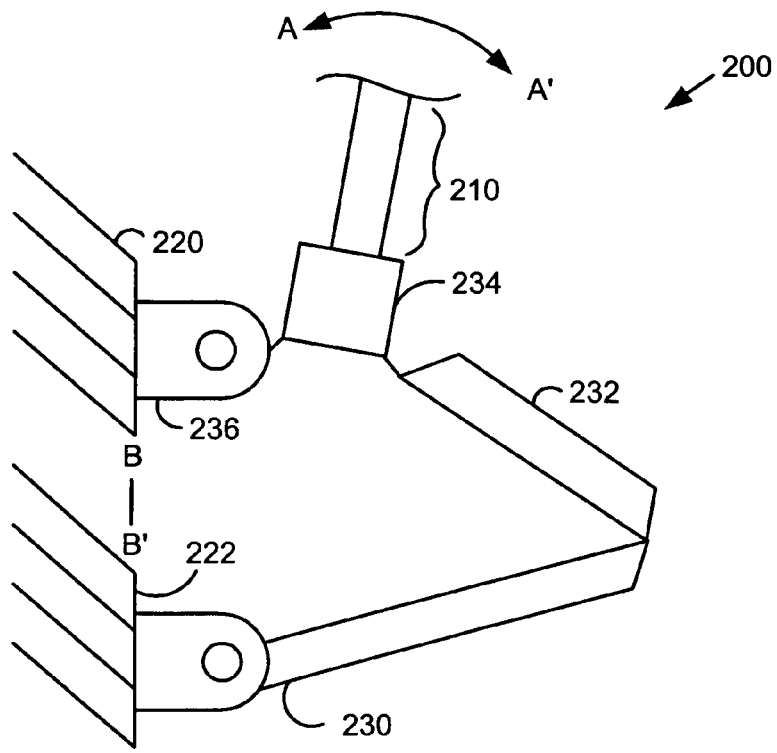
FIG. 5 shows an alternative haltere design using a fourbar linkage.

A second embodiment using a fourbar linkage 200 is shown in FIG. 5. Such a linkage is known in the art. Sections of the linkage include 230, 232, 234 and 236. One or more actuators 220, 222 can be used to move sections of the linkage. Actuator movement is to move section 230 in the direction around B–B' so that beating of haltere 210 occurs in the direction A–A'. Details of the fourbar linkage design are described in the co-pending patent application referenced above.

The design of the second haltere can be similar to designs used for an MFI thorax structure in other MFI devices. See, e.g., "Proc of the IEEE International Conference on Robotics and Automation," pages 1509–1516, April 2000. The haltere is placed on the output link of a mechanically amplifying fourbar structure. The fourbar takes the small linear displacement of the actuator and transforms this into large angles at the output. This technique gives better control over the motion of the haltere, allowing for large stroke amplitudes at high resonant frequencies. Since the Coriolis force acting on the haltere mass is proportional to the haltere velocity, this method of actuation should give greater sensitivity for detection of body angular velocity.

Assuming similar kinematic and dynamic constraints as the MFI thorax, 120° stroke amplitude at 150 Hz, and resolution constraints for sensing the forces, there are again four parameters to determine. Three geometric parameters and the mass of the haltere are constrained by four defining equations. First, it is desired that the stiffness in the lateral direction of the haltere is significantly higher than the drive frequency so that the lateral resonant mode is not excited during actuation. Setting the lateral resonant frequency at 500 Hz gives the following:

$$2\pi \cdot 500 = \sqrt{\frac{Kl}{m}} = \sqrt{\frac{Ebh^3}{4l^3m}} \quad (4)$$

where $k_l$ is the lateral stiffness, m is the mass of the haltere (again assumed to be greater than the cantilever mass), E is the modulus of the material used, and b, h, and l are the width, thickness, and length of the cantilever, respectively.

Next, the minimum Coriolis force is given as a function of the minimum detectable strain.

$$F_{c,min} = \frac{Ebh^3}{6l}\varepsilon_{min} \quad (5)$$

For the given kinematic parameters and the desired drive frequency, the haltere velocity is $200\pi \cdot 1$. Now from equation 1, the minimum Coriolis force can be related to the minimum detectable angular velocity (again assumed to be 1 rad/s) by the following:

$$F_c min = 2m\omega_{min} \times v = 400\pi \cdot m \cdot l \quad (6)$$

Equating equations 5 and 6 gives the following:

$$Ebh^3\varepsilon_{min} = 2400\pi \cdot m \cdot l^2 \quad (7)$$

where the minimum detectable strain is a known parameter. The last constraint is from the dynamics of the MFI thorax and is based upon the desired MFI wing inertia. Equating the haltere inertia with the wing inertia gives the following:

$$J = m \cdot l^2 \quad (8)$$

The inertia of the haltere, $J=40$ mg–mm$^2$, is only twice the MFI wing inertia. Choosing b=1 mm because of geometric constraints of the fourbar gives three unknown parameters to be solved from equations 5, 7, and 8. Choosing m=4 mg, l=5 mm, and h=50 μm gives a close fit to the three constraints, while still considering construction difficulties.

Although the invention has been discussed with respect to specific embodiments thereof, these embodiments are merely illustrative, and not restrictive, of the invention. For example, although the preferred embodiments use a piezoelectric material as part of the actuator, any other suitable means of actuation may be employed including mechanical, electromechanical, chemical, biological, etc. Certain elements or components of the haltere design need not be present in other suitable designs. Also, elements or components may be changed from, or added to, the designs described herein without departing from the scope of the invention. For example, other designs can use more, or less, than two strain gages located in different positions. Sensors for detecting haltere rod bending need not be resistive strain gages but can be capacitive or other types. Bending can be detected in other manners than by strain gages such as by electrical, mechanical, electromechanical, optical, or other means.

Alternative designs may omit or modify the compliant section, end mass and other elements of the design. Different haltere beat frequencies can be used, as desired and as practicable and effective.

Embodiments of the design have variously been made from folded steel and also from carbon-fiber composite material. However, various elements and components of the haltere and actuator can be made from any suitable materials. Certain materials may provide additional benefits. For example, use of a material that is conducting may allow the material to act as an electrical conductor so that wires and bonding pads for the strain gage signal can be minimized.

In the description herein, numerous specific details are provided, such as examples of components and/or methods, to provide a thorough understanding of embodiments of the present invention. One skilled in the relevant art will recognize, however, that an embodiment of the invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the present invention.

Reference throughout this specification to "one embodiment", "an embodiment", or "a specific embodiment" means that a particular feature, structure, or characteristic described in connection with the embodiment is included in at least one embodiment of the present invention and not necessarily in all embodiments. Thus, respective appearances of the phrases "in one embodiment", "in an embodiment", or "in a specific embodiment" in various places throughout this specification are not necessarily referring to the same embodiment. Furthermore, the particular features, structures, or characteristics of any specific embodiment of the present invention may be combined in any suitable manner with one or more other embodiments. It is to be understood that other variations and modifications of the embodiments of the present invention described and illustrated herein are possible in light of the teachings herein and are to be considered as part of the spirit and scope of the present invention.

It will also be appreciated that one or more of the elements depicted in the drawings/figures can also be implemented in a more separated or integrated manner, or even removed or rendered as inoperable in certain cases, as is useful in accordance with a particular application.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The foregoing description of illustrated embodiments of the present invention, including what is described in the Abstract, is not intended to be exhaustive or to limit the invention to the precise forms disclosed herein. While specific embodiments of, and examples for, the invention are described herein for illustrative purposes only, various equivalent modifications are possible within the spirit and scope of the present invention, as those skilled in the relevant art will recognize and appreciate. As indicated, these modifications may be made to the present invention in light of the foregoing description of illustrated embodiments of the present invention and are to be included within the spirit and scope of the present invention.

Thus, while the present invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the present invention. It is intended that the invention not be limited to the particular terms used in following claims and/or to the particular embodiment disclosed as the best mode contemplated for carrying out this invention, but that the invention will include any and all embodiments and equivalents falling within the scope of the appended claims.

What is claimed is:

1. An apparatus for sensing angular motion, the apparatus comprising:
   a body;
   a first rod coupled to the body;

a second rod coupled to the body, wherein the first and second rods are non-parallel;

at least one sensor for sensing a bending of the rods in response to a rotational movement of the body; and an actuator for causing a movement of a rod, wherein the actuator includes one or more bars coupled to the actuator and to the flat beam to transfer the movement produced by the actuator to the flat beam, wherein the one or more bars comprise a fourbar linkage.

2. A method for detecting body rotation, the method comprising:

detecting a Coriolis force on first and second non-parallel rods coupled to the body;

transforming the detected Coriolis force into an angular rate; and actuating a rod, wherein actuating includes using a four-bar structure.

* * * * *